United States Patent [19]

McDowell

[11] E Re. 30,921

[45] Reissued May 4, 1982

[54] APPARATUS FOR SETTING UP FOLDED CARTONS

[76] Inventor: James E. McDowell, 3109 Sidney Ave., Orlando, Fla. 32810

[21] Appl. No.: 168,362

[22] Filed: Jul. 10, 1980

Related U.S. Patent Documents

Reissue of:

[64] Patent No.: 4,170,929
Issued: Oct. 16, 1979
Appl. No.: 800,007
Filed: May 24, 1977

[51] Int. Cl.[3] ..... B31B 5/02

[52] U.S. Cl. ..... 493/124; 53/564; 271/99; 271/132; 493/125; 493/131; 493/141; 493/317

[58] Field of Search ..... 493/121, 122, 123, 124, 493/125, 126, 131, 141, 181, 309, 313, 316, 319, 317; 53/457, 458, 564, 566, 572, 573; 271/99, 102, 132

[56] References Cited

U.S. PATENT DOCUMENTS

| | | | |
|---|---|---|---|
| Re. 27,631 | 5/1973 | Berney | 493/313 |
| 1,155,503 | 10/1915 | Moore | 271/102 |
| 2,331,533 | 10/1943 | Bishop | 271/99 |
| 2,671,385 | 3/1954 | Johenning et al. | 493/310 X |
| 3,202,420 | 8/1965 | Dovey | 271/99 |
| 3,226,108 | 12/1965 | Bishop | 271/99 |
| 3,333,514 | 8/1967 | Jones | 493/181 |
| 3,397,624 | 8/1968 | Currie, Jr. et al. | 493/141 X |
| 3,421,415 | 1/1969 | Pearson | 493/141 X |
| 3,451,192 | 6/1969 | Irwin | 53/573 |
| 3,478,487 | 11/1969 | Smith et al. | 53/564 X |
| 3,482,489 | 12/1969 | Neal et al. | 493/141 X |
| 3,509,684 | 5/1970 | Hohl et al. | 93/53 SD X |
| 3,556,316 | 1/1971 | Marasso et al. | 53/572 X |
| 3,648,574 | 3/1972 | Luke | 493/181 X |
| 3,763,750 | 10/1973 | Reichert | 493/125 X |
| 3,783,752 | 1/1974 | Langen et al. | 493/18 X |
| 3,888,164 | 6/1975 | Taddei | 493/125 |
| 3,952,636 | 4/1976 | Reichert | 493/207 X |
| 3,956,976 | 5/1976 | Vogel et al. | 493/315 |
| 3,964,374 | 6/1976 | Stolkin et al. | 493/131 X |
| 3,982,474 | 9/1976 | Klund | 493/18 X |
| 4,003,299 | 1/1977 | Sternheimer | 493/309 X |
| 4,018,143 | 4/1977 | Dice, Jr. et al. | 493/309 X |
| 4,133,254 | 1/1979 | Odom et al. | 493/316 X |

FOREIGN PATENT DOCUMENTS

| | | | |
|---|---|---|---|
| 2348370 | 4/1975 | Fed. Rep. of Germany | 93/53 SD |

*Primary Examiner*—Paul A. Bell
*Attorney, Agent, or Firm*—Richard H. Stern

[57] ABSTRACT

An apparatus for setting up folded cartons in which a frame has a folded carton magazine attached thereto adjacent a carton conveyor. A carton set-up station is mounted at one end of the conveyor adjacent the magazine, and the bottom carton in the magazine is grasped by suction cups and moved to the set-up station. The carton is set-up in the set-up station and fed to the conveyor as the minor flaps are folded, glued, and the major flaps folded, and finally, the major and minor flaps compressed for the glue to dry and the carton discharged.

28 Claims, 10 Drawing Figures

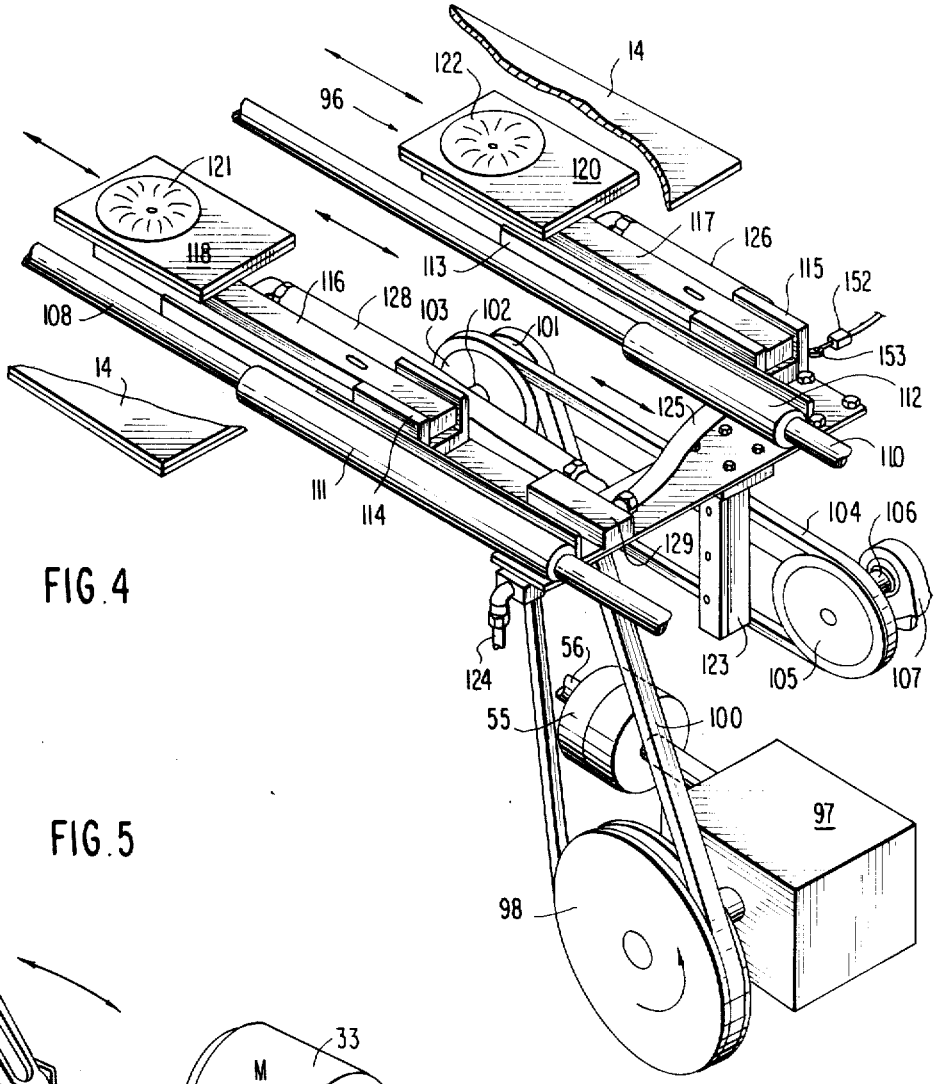
FIG. 4
FIG. 5
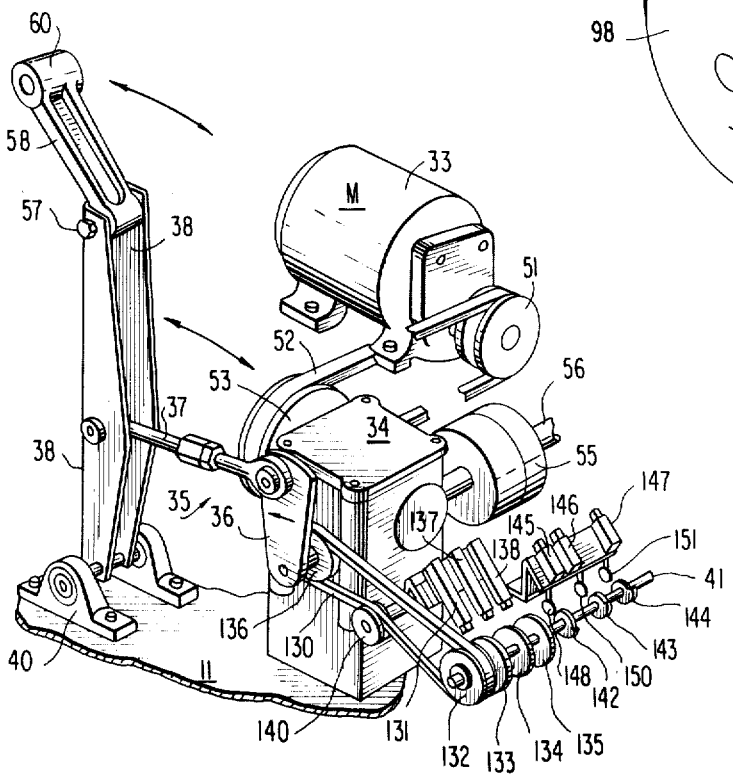

APPARATUS FOR SETTING UP FOLDED CARTONS

Matter enclosed in heavy brackets [ ] appears in the original patent but forms no part of this reissue specification; matter printed in italics indicates the additions made by reissue.

BACKGROUND OF THE INVENTION

The present invention relates to a folded box or carton set-up machine and more particularly to a simplified machine for setting up folded blanks of corrugated cartons.

In the past, machines of many kinds have been provided for opening containers which are manufactured and shipped in a knocked down or flattened state. In the knocked down shipping state, the four sides are permanently secured together and each side has a bottom flap thereon which is extended outwardly from side to side. Cartons are supplied from factories in this condition to conserve shipping space. However, in order to ready the boxes for loading, it is necessary to open the boxes by moving the sides apart until the adjacent sides are at right angles and then bending in the inside and outside bottom flaps to enclose the bottom. It is also necessary that the folded bottom flaps be glued or otherwise connected together prior to loading the boxes. It is still common in the art to see boxes of this type assembled by hand, utilizing many man-hours setting up each individual box by hand, and gluing or stapling the bottom together prior to loading. It is, of course, still economical to provide this function by hand when only a small number of boxes is involved; however, for assembling and loading large numbers of boxes, such as for production lines, and the like, it becomes desirable to reduce the number of man-hours and labor by going to systems automatically assembling or setting up boxes. Accordingly, many machines have been developed whose principle purpose is to automatically take folded cartons and assemble them. These machines usually have a feed mechanism for feeding flat or knocked down boxes from a stack one at a time, grasping opposite sides of the folded carton and lifting one away from the other to unfold the box, then folding the inside and outside flaps and ejecting the box from the machine. It has also been suggested to provide for automatic gluing of the bottom flaps of the box during the folding operation whereby the box, as ejected from the machine, is ready for loading. These prior art machines have not always been completely reliable in operation and have been frequenty complex machines subject to break-downs and jammings, such as when blanks are fed to the machine of a slightly different shape or size than the machine is adapted to handle. Many of these prior art machines also have complex mechanisms for handling each step of the box folding operation and have complex feeding mechanisms to drive the blank from one station to the next along the machine. One advantage of the present invention is to provide a simplified box folding machine utilizing a simplified reciprocating mechanism for moving the carton from a magazine loaded with folded blanks to a set-up station and then in one continuous movement from the set-up station to the flap folding and gluing and to a flap compressing station. The next box in the cycle can then push the box in the compressing station out of the machine.

SUMMARY OF THE INVENTION

The present invention relates to an apparatus for setting up folded cartons or containers in which a frame supports a folded carton magazine which holds a stack of folded cartons to one side of a carton conveyor. The carton conveyor has a carton set-up station located at one end thereof and adjacent the carton magazine for receiving one folded carton at a time from the carton magazine by the set-up station. A side feed feeds one folded carton at a time from the bottom of the carton magazine to the carton set-up station by having a pair of suction cups grasp the bottom carton, and slide it to the set-up station where a pair of set-up suction cups grabs the carton while the side feed releases the carton and returns for the next carton in the magazine. Once the carton is set up, it is conveyed down the conveyor, where the flaps are folded and glued, to a compressing station where the glued flaps are compressed. The carton is then discharged from the machine.

BRIEF DESCRIPTION OF THE DRAWINGS

Other objects, features and advantages of the present invention will be apparent from the written description and the drawings in which:

FIG. 4 is a cut-away perspective view of the side feed mechanism of the machines of FIGS. 1 through 3;

FIG. 5 is a perspective view of the main drive and timing cam of the folding machine in accordance with the present invention;

DESCRIPTION OF THE PREFERRED EMBODIMENT

Figure 1:
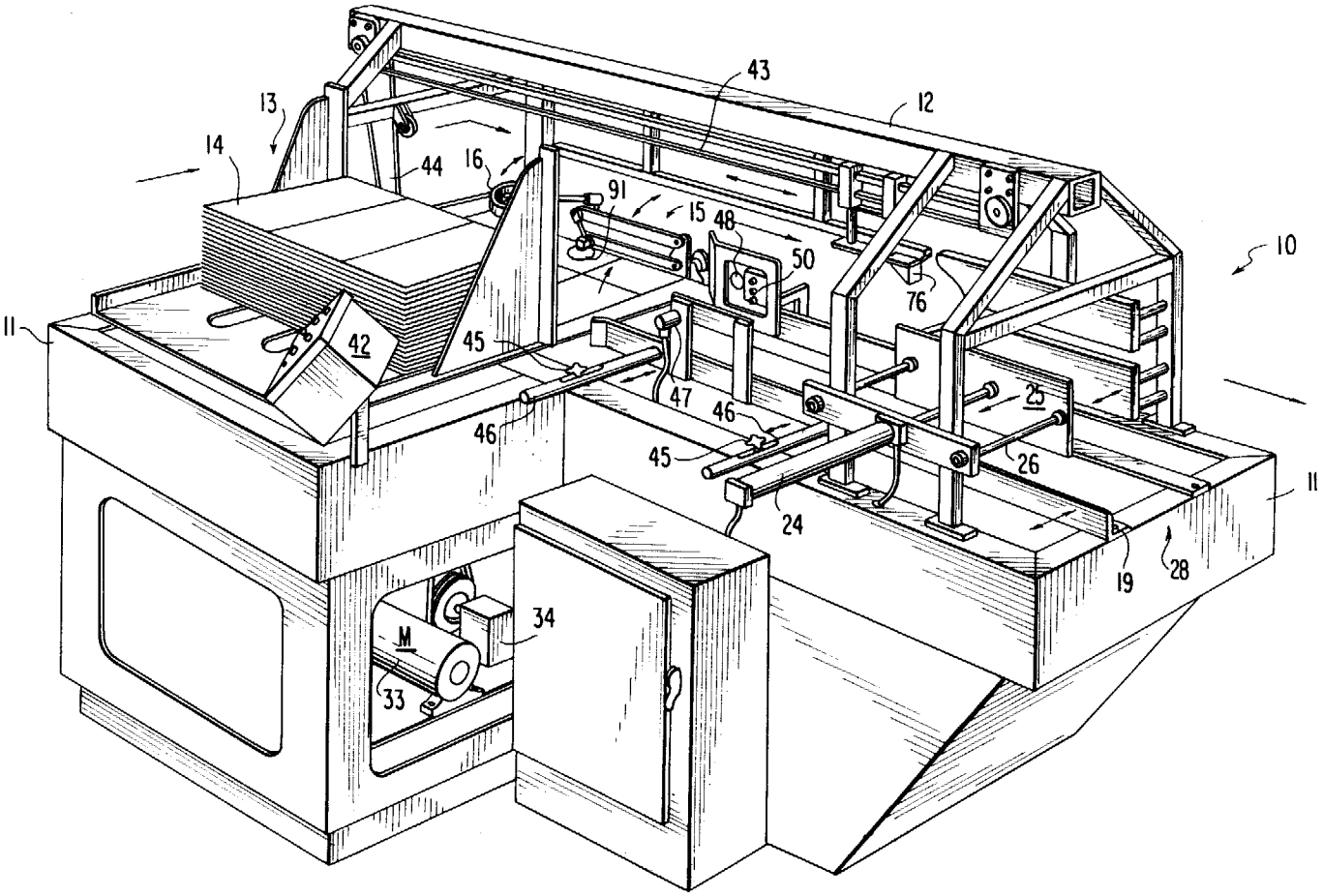
FIG. 1 is a perspective view taken from one side of a carton set-up machine in accordance with the present invention.
Figure 2:
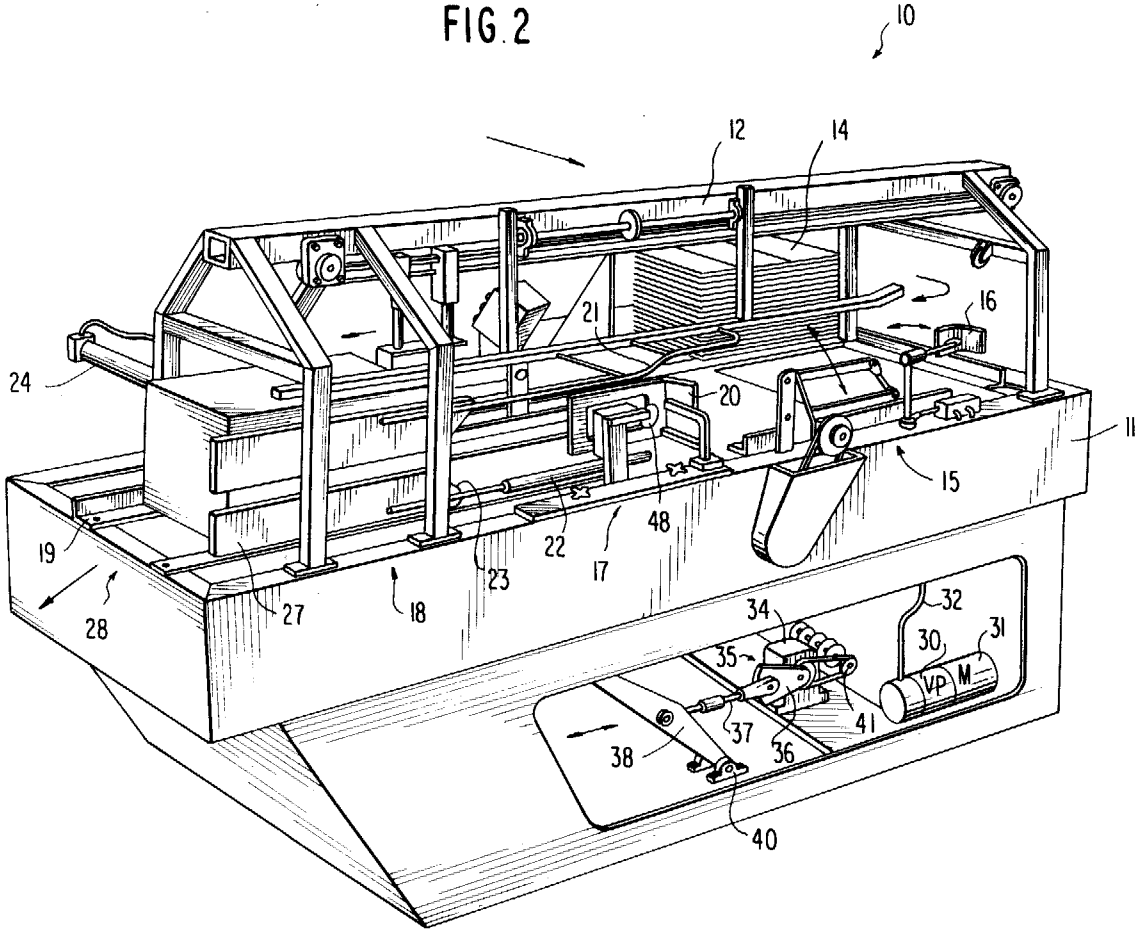
FIG. 2 is a perspective view of the carton set-up machine of FIG. 1, taken from the opposite side.

Referring now to the drawings in general and especially to FIGS. 1 and 2, a carton setting up machine 10 has a base frame 11 and a conveyor frame 12. To one side of the conveyor frame 12 is the folded carton hopper or magazine 13 supporting a stack of cartons 14. The folded cartons are fed from the bottom of the stack 14 to a set-up station 15 where the folded carton is set up and the rear minor flap is tucked in with the rear minor flap tucker 16. The partially set-up carton is then gripped by upper and lower dogs attached and moved in one motion from the set-up station through the gluing station 17 to the compression station 18 on conveyor carton base slide members 19. As the box is pushed through a flap guide 20 folds minor front flap and a photocell actuates a glue gun as the minor flap passes thereby, but shuts off the glue gun during the spacing between the minor flaps. Simultaneously, an upper major flap guide 21 and a lower major flap guide 22 begin to fold the major flaps inward towards the minor flaps and a curved surface 23 fully folds the major flaps onto the minor flaps which have now had glue applied thereto. The box is pushed into the compressing station 18 where a single air cylinder 24 drives a compression plate 25 riding on a pair of sliding shafts 26 to compress major and minor flaps together against back compression plates 27 to complete the adhesion of the flaps together. The air cylinder 24 then withdraws the compression plate 25 and as the next box is moved forward, the box in the compression station is pushed out the discharge end 28 of the machine. Also seen in this view is the vacuum pump 30 driven by a motor 31 and connected by a vacuum line 32 to the vacuum lines for operating a set-up station and side feed vacuum cups located in a side feed mechanism for moving the cartons from the magazine to the set-up station and in the set-up station. An electrical motor 33 drives and synchronizes the remainder of the operations of the machine. The motor 33 drives a gear box 34 which drives a bell crank mechanism 35 having a crank 36, crank arm 37, and a main drive arm 38 pinned to the base frame 11 with a bracket and pin 40. The motor 33 also drives a cam shaft 41 which operates certain timing valves and micro-switches as will be further described hereinafter.

In FIG. 1, a control box 42 can be used for turning the machine on and off, and the top chain drive 43 can be driven by a synchronizing chain 44. In addition, a pair of threaded handles 45 allows the guide bar 46 to be adjusted for different sized cartons. FIG. 1 also shows a lamp 47, which may be an LED, aimed at a photodetector 48 which actuates a glue gun 50 having a plurality of nozzles for spraying glue onto the minor flaps of a passing carton. The glue gun is actuated when the machine is on only when the photodetector senses an object blocking the light from the lamp 47 [thereby spraying], *that is, when a minor flap passes in front of lamp 47. When light is so blocked photodetector 48 actuates glue gun 50 thereby causing it to spray* glue when the minor flaps of the carton are directly in front of the glue gun.

Figure 3:
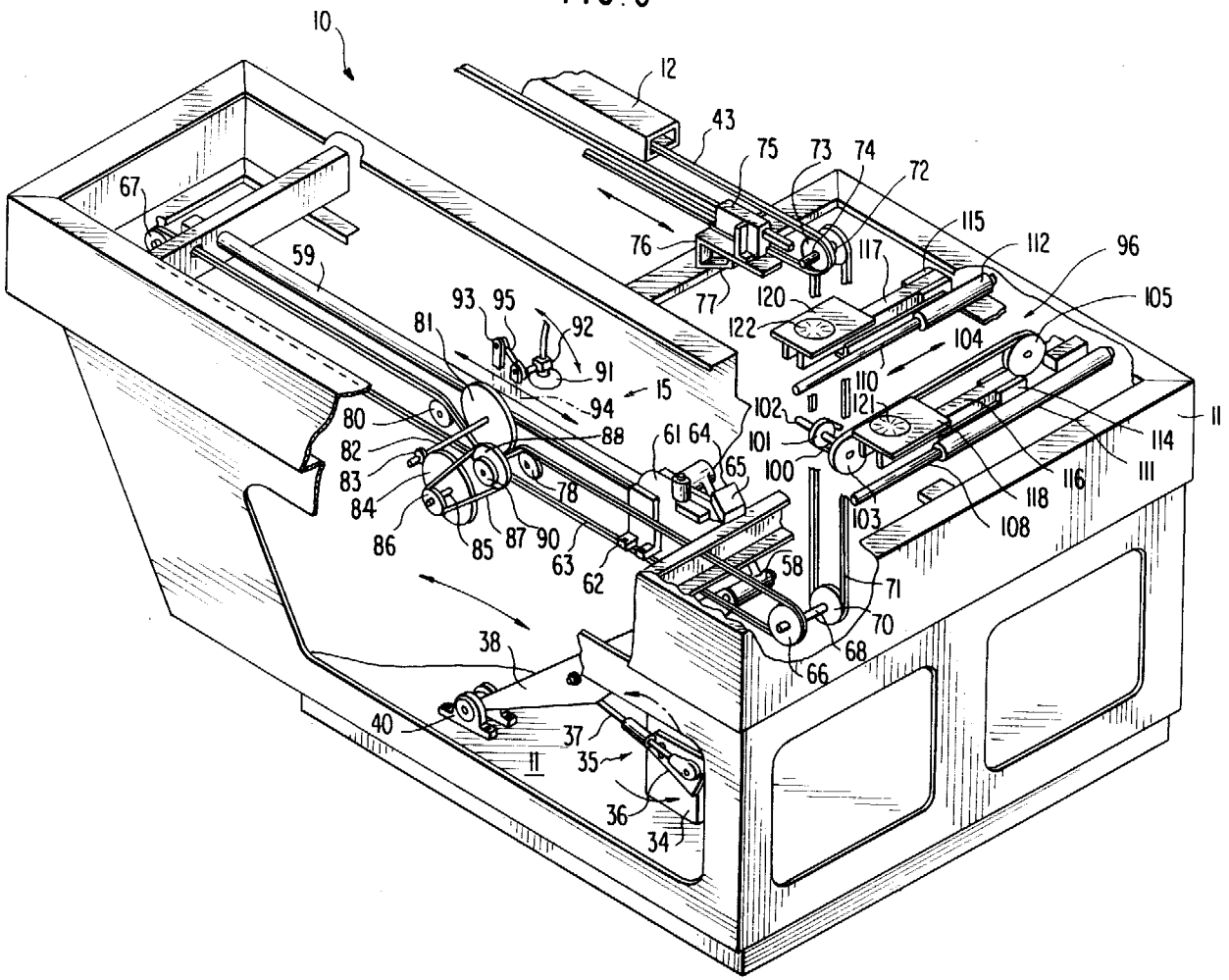
FIG. 3 is a cut-away perspective view of the drive mechanism of the carton machine of FIGS. 1 and 2.

Turning more specifically to FIGS. 3 and 5, the operation of the main drive for the carton set-up machine 10 is illustrated in which the electric motor 33 drives a pulley 51 which drives a belt 52, which, in turn, drives a pulley 53 connected to the gear box 34. The gear box has a clutch 55 connected to the main shaft 56 and the main shaft 56 is also connected to the crank 36 which is connected to the crank arm 37 and to the main drive 38, which is pinned by the bracket and pin 40 to the base frame 11. The main drive 38 of the bell crank mechanism 35 is connected by bolt 57 to a linkage arm 58 having a shaft collar 60 on the opposiite end thereof. [The] *As shown in FIG. 3, the* linkage arm 58 is connected to a carriage member 61 riding on an elongated support rod 59[, which]. *The carriage 61* has a chain connection 62 connecting to the lower drive chain 63. The carriage 61 is connected to the lower dog 64 which is spring-loaded on the carriage 61 to be biased slightly upwards and have an angled surface 65 on the back portion thereof. This allows the dog 64 to engage a carton in one direction and to slide under a preceeding carton on the return stroke. The movement of the main drive 38 forward drives the carriage 61 forward and along with [a] *the* lower chain 63 which is mounted between a pair of sprockets 66 and 67. Sprocket 66, in turn, is attached to a shaft 68 which is attached to a sprocket 70 having a chain 71 driven thereby, which in turn, drives a sprocket 72 and the upper drive chain 43 through a drive sprocket 73 and shaft 74. The upper drive chain 43 has a dog carriage 75 attached thereto with an upper dog 76 riding therebelow and also having an angled surface 77 whereby upper dog 76 can engage a carton simultaneously with lower dog 64 to move in one stroke through the conveyor to the compressing station[. And], *and* then on the return stroke, pass over a set-up carton in the set-up station. Crank 36 rotates in a continuous circle driving the main drive 38 in a complete stroke and [the] *then* returns the main drive 38 in the stroke thereby driving the chain 63 over a predetermined distance and returning the chain with the carriage 61 to its starting position. Inasmuch as the chain 63, sprocket 66 and 70, chain 71, sprocket 72 and 73, and upper chain 43 are all interconnected, the positioning and timing of the chains always remains the same.

Figure 6:
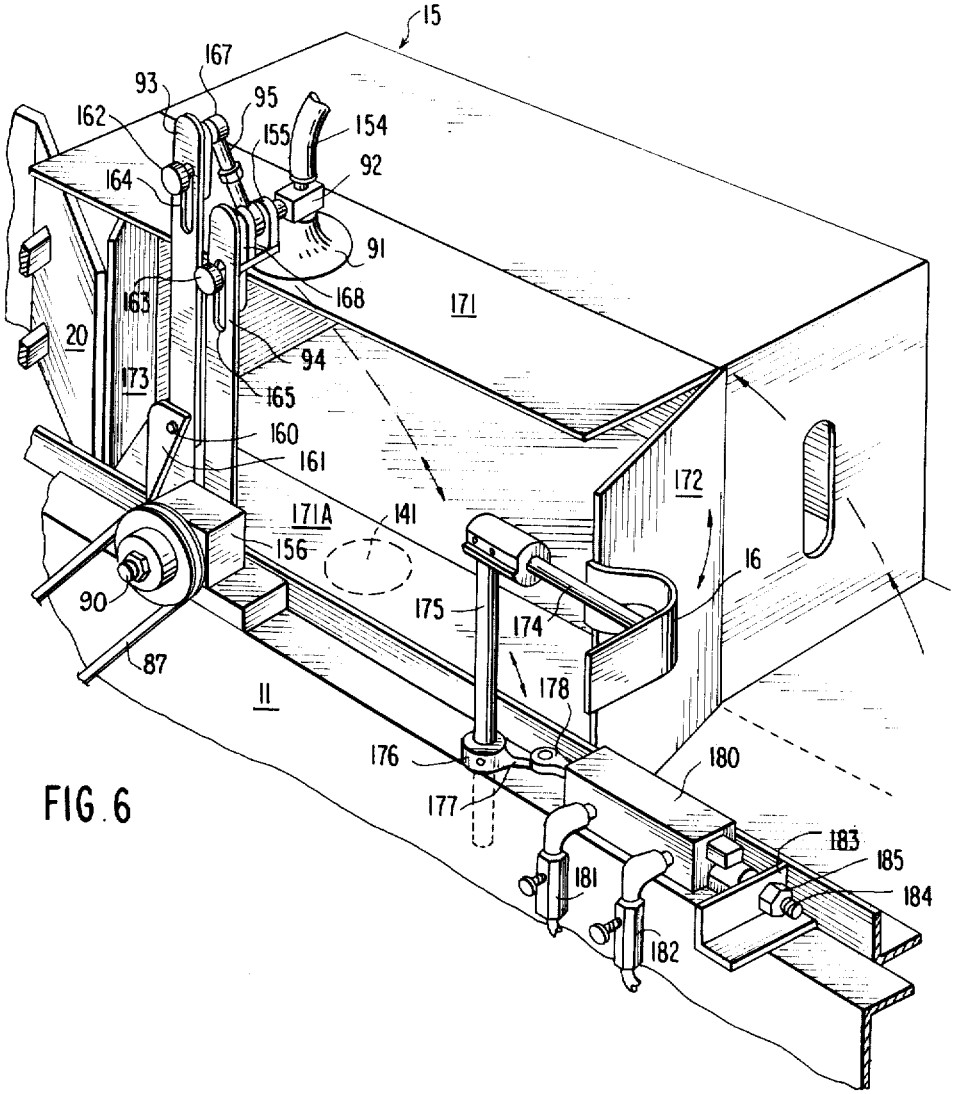
FIG. 6 is a perspective view of a carton set-up mechanism of the carton set-up machine of FIGS. 1 through 5.

The lower drive chain 63 is also supported on a pair of idler sprockets 78 and 80 which maintain the chain 63 against a sprocket 81 which is connected by a shaft 82 to a small connecting gear 83 which, in turn, is connected to a gear 84, shaft 85 and drive sprocket 86, which is connected to a chain 87 and to a sprocket 88 connected to a shaft 90. This drive sequence reduces the distance the sprocket 88 is rotated in each direction with the back and forth movement of the chain 63. This timing sequence allows the carton set-up mechanism 15 to be raised to an upright position and lowered with each stroke of the back and forth movement of the chain 63 and in a timed relationship therewith. [A] *As shown in FIG. 6, as well as FIG. 3, a* vacuum suction cup 91 is mounted to a bracket 92 attached to the set-up mechanism 15 for engaging the folded carton by a major flap and raising the folded carton with the set-up mechanism 15. [It will, of course, be appreciated that] *As shown in FIG. 6,* a vacuum cup *141 (shown in dotted line)* simultaneously engages the bottom of a folded carton to hold the bottom in position while the carton is being set-up by the raising of the set-up mechanism 15. The set-up mechanism 15 includes a pair of parallel linkage arms 93 and 94, connected by a linkage 95 and raises the cartons in the manner of a parallelogram or pantagraph mechanism. This set-up mechanism advantageously raises the major flap of the carton being set up approximately ½ inch higher than the top of the carton to allow the minor flaps to be easily tucked between the major flaps without bumping against the major flaps. A side feed mechanism 96, *shown in FIGS. 3 and 4,* is also driven in a timed sequence by [a] *the* motor 33 through the shaft 56 and clutch 55 which drives a reduction gear 97 of FIG. 4 which drives a sprocket 98 and chain 100. [The] *As shown in FIGS. 3 and 4, the* chain 100, in turn, drives a sprocket 101 [and shaft] *on a shaft 102* which drives a sprocket 103 and chain 104 which also rides on a sprocket 105 mounted to a shaft 106 and bracket 107. The chain drive 104 in turn, in proper sequence, slides the side feed mechanism 96 on a pair of shafts 108 and 110, riding in sliding bushings 111 and 112. The bushings 111 and 112 have frame members 113 attached thereto with a pair of brackets 114 and 115. The brackets 114 and 115 in turn, have a pair of lifting arms 116 and 117, pinned thereto and supporting a pair of rubber plates 118 and 120, having suction cups 121 and 122 thereon. The arms 116 and 117 are slighty lifted to push the plates 118 and 120 against the next lower carton [and] *in carton stack 14 in* the folded carton magazine 13 [(FIGS. 1 and 2)] *FIG. 1* whereupon the suction cup 121 and 122 are actuated to create a vacuum to grasp the lower folded carton at which time the drive chain 104 is actuated in the proper sequence to slide the mechanism through a chain-connecting member 123 forward to slide the bottom folded carton to the set-up station 15. This operation is more clearly illustrated in connection with FIG. 4, which also shows the connection of the vacuum line 124 from the vacuum pump 30 *(shown in FIG. 2)* which is connected to junction box 129 and through vacuum lines [125 and 126] *125, 126, and 128* to the vacuum [cup 120 while the junction box 129 also connected to vacuum line 128.] *cups 121 and 122.* Lifting arms 116 and 117 each have a small pancake air cylinder thereunder actuated by the machine's air source in a timed sequence to lift the arms to engage the next folded carton in the magazine. The vacuum lines are controlled by the cam shaft 41, as may be seen in FIG. 5, which is driven by a chain 130 connected to a sprocket [131] *136* on the shaft 56 and to a sprocket 132 on the cam shaft 41. The cam shaft has three air [valves] *valve* operating cams 133, 134, and 135, operating three air valves [136] *131*, 137, and 138. Air is supplied from the compressed airlines which are attached to the machine and operated by the valves. Cam 133 operates the tucker arm 16 of FIGS. 2 and 6 in the proper time sequence in accordance with the cam 133, which in turn, is rotated in timed sequence with the main shaft 56 and thereby in timed sequence with the main drive 38. An idler sprocket 140 maintains the chain 130 taunt. Cam 134 drives the air valve 137, which in turn, drives the compression station air cylinder 24 of FIGS. 1 and 2 in the proper timed sequence in accordance with the cam lobes on cam 134, while the cam [153] *135* actuates the air valve 138 which switches the vacuum from the side feed suction cups 121 and 122 (FIGS. 3 and 4) to the suction cup 91 and the bottom suction cup 141 of the set-up mechanism (FIG. 6). That is, the vacuum is maintained at all times, but is operated by the cam 135 *of FIG. 5* to apply a vacuum to the side feed cups [120 and 121] *121 and 122* when a folded carton is being grasped from the magazine 13 and shifted over to the set-up mechanism. The vacuum is thereupon switched, releasing the carton from the cups 120 and 121 and grasping the carton with suction cups 91 and 141, while the side feed mechanism is returned for grasping the next folded carton from the magazine. Cam shaft 41 also has three small cams 142, 143, and 144 thereon which work in connection with three electrical [microswitched] *microswitches* 145, 146, and 147, operated by cam followers 148, 150, and 151. Cam 142 actuates the microswitch 145 which actuates the clutch 55 to start the side feed mechanism 96 sliding with a carton in a timed sequence in accordance with the lobes on the cam 142. Cam 143 actuates the microswitch 146 which is a safety switch which works in connection with a microswitch 152, having a follower 153 (FIG. 4). The safety switch 146 disengages motor 33 to shut down the machine on the timed sequence of the cam 143 if the microswitch 152 indicates that the side feed mechanism 96 is not returned to the proper position by the time the safety switch cam 143 actuates the safety switch 146. In normal operation, this will always happen so that the motor 33 will not be disengaged by the microswitch 146. Cam 144 drives a cam follower 151 to actuate the microswitch 147 to stop the cycle of the main drive 38 at the top if there is a carton jammed or a nonerected carton.

Figure 7:
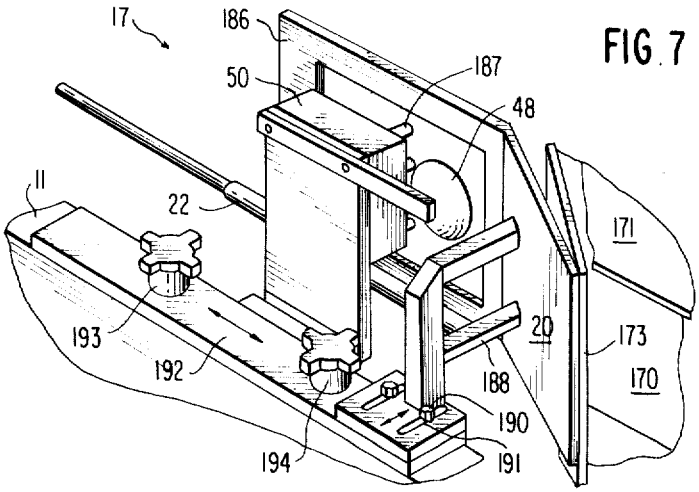
FIG. 7 is a perspective view of the front minor flap folding mechanism and gluing mechanism of the carton folding machine in accordance with the present invention.

Turning now to FIG. 6, the set-up mechanism 15 is more clearly illustrated having a top suction cup 91 and a bottom suction cup 141 [with a] *(shown in dotted line) with the* top suction cup being supported by a suction connection 92 which is connected to a vacuum line 154. The connection [154] *92* is connected to a bracket 155 which is connected to an arm 94 of a parallel linkage including arm 93 and 95. Arm 94 is connected to a support block 156 *and is* driven by a shaft [157] *90* driven by a chain drive [158] *87* which is connected to the shaft 90 of FIG. 3. Linkage arm 93, in turn, is pinned with a support pin 160 and attached to a support bracket 161, *which is attached to a portion of the frame 11,* while a pair of threaded knobs 162 and 163 positioned in a pair of slots 164 and 165 located in the arms 93 and 94 respectively, allow support [brackets] *bracket* 167 and *support bracket portion* 168 *of bracket 155* to be adjusted for different sized cartons 170, to be set up in the same mechanism. The carton 170 has *upper and lower* major flaps 171 *and 171A* and a rear minor flap 172 and front minor flap 173. The rear minor flap 172 is tucked in by a tuck arm 16 since the upper major flap 171 is raised above the side of the box 170. The tuck arm 16 is connected to an arm 174 which is connected to a rotating shaft 175 connected to a collar 176 which is connected to an arm 177 which is pulled by piston rod 178 of an air cylinder 180 connected by a pair of air lines 181 and 182 and supported to the frame by bracket 183 with a threaded bolt 184 and nut 185. Air is applied to the cylinder 180 responsive to the operation of the cam 133 *(FIG. 5)* driving the air valve [136] *131* in the proper sequence to tuck the rear flap 172 inwards as soon as the carton 170 is raised. Once the carton is raised and the flap 172 tucked in, the flap 173 has begun being tucked in by the minor flap front tucking member 20 and as the box is shoved from the set-up position in FIG. 6 by the upper dog 76 and lower dog 64 *(FIG. 3)*, it passes the glue station 17 *(FIGS. 2 and 7)* which has a window 186 with a plurality of gluing nozzles 187 of the glue gun 50, which is actuated by photodetector 48 as heretofore described. The window frame 186 forms a minor flap tucking portion 20 which is further braced by support frame members 188 attached by bolts 190 in slots 191 to a frame member 192 which, in turn, is supported by a pair of threaded handles 193 and 194 to a portion of the frame 11. Thus, loosening the bolts 191 can allow the adjustment of the tucking portion 20 while moving the frame member 192 by the loosening of threaded handles 193 and 194 which allows the repositioning of the glue gun 50 for different sized minor flaps on different sized cartons.

Figure 8A:
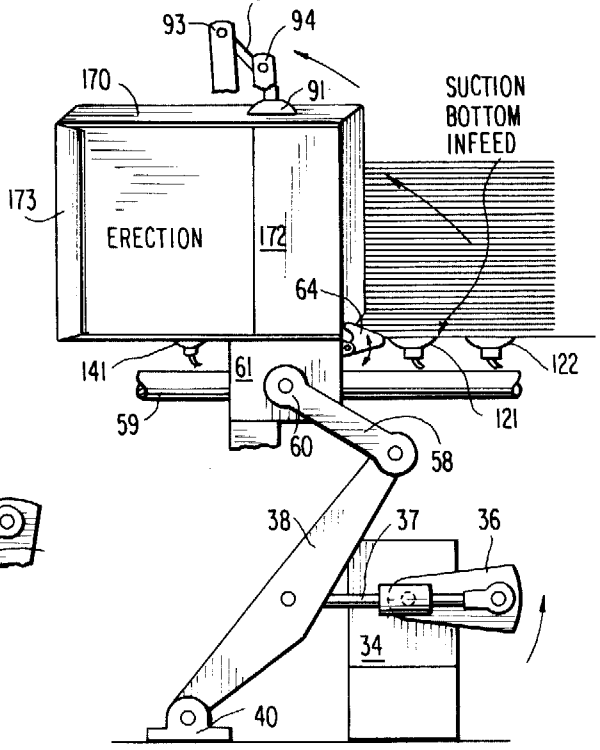
FIGS. 8a, b and c, are sectional views of the main drive mechanism delivering a carton through different positions of the conveyor.
Figure 8B:
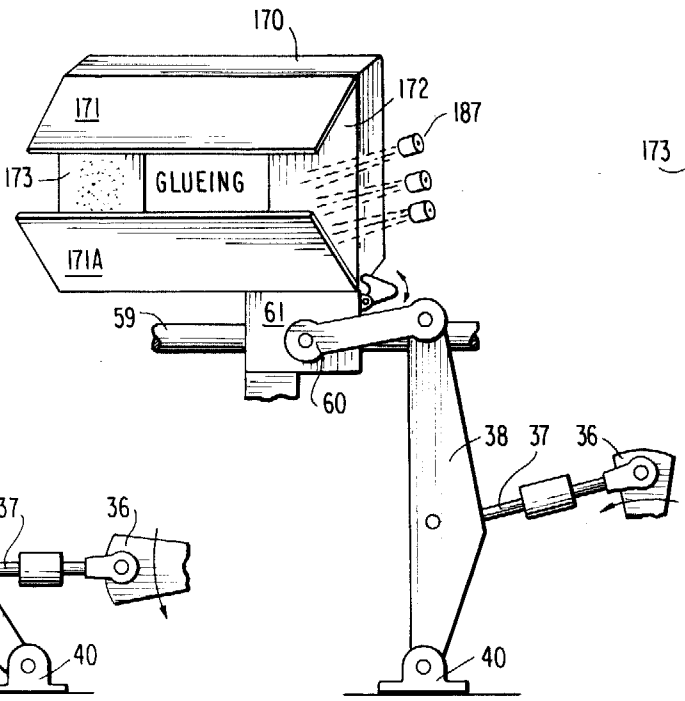
Figure 8C:
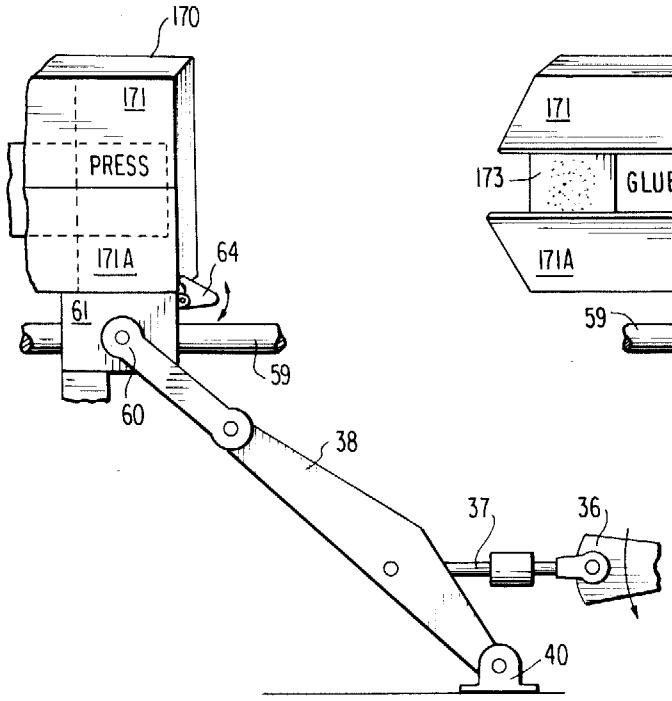

The sequence of operation on the conveyor is more clearly illustrated in connection with FIGS. 8(a), (b), and (c), in which FIG. 8(a) has the carton being erected in the carton set-up station and moved by the [main drive] *upper dog 76 (FIGS. 1 and 3) and lower dog 64 (FIGS. 8(a) and (c))* to the glue spray operation of FIG. 8(b) and then further moved to the compressing station of FIG. 8(c). In FIG. 8(a), the suction cup 91 attached to the arms [94 and 95] *93 and 94* has lifted the carton while a suction cup 141 is [supporting] *grasping* the carton 170 from the bottom and the rear minor flap 172 has been tucked in. The lower dog 64, as shown engaging the edge of the carton [and], is supported by the dog carriage 61 which is driven by the arm 58 driven by the main drive 38 supported in the support bracket 40 and driven by the crank arm 37 and crank 36, which is driven by the gear box 34[, the]. *The* box 170 is driven in one continuous operation to the compressing station of FIG. 8(c) and is glued by the glue [nozzle 181] *nozzles 187* as it passes by the glue operation on 8(b) and is compressed in the compressing operation 8(c) prior to being discharged from the carton set-up mechanism.

It should be clear to those skilled in the art that a carton set-up machine has been provided for taking cartons one at a time from a magazine, sliding the cartons to a set-up station, raising the cartons, gluing and folding the flaps, compressing the flaps and discharging the cartons. The cartons ride on a conveyor having a main conveyor framework 12 and a carton support member 19 for the carton to slide on. It should also be clear that timing is accomplished through a simplified single timing drive to always make the timing sequence of all the timing operations in the proper sequence. The present invention, however, is not to be construed as limited to the particular forms as disclosed herein which are to be regarded as illustrative rather than restrictive.

I claim:

1. An apparatus for setting up folded cartons, *said cartons each having two major flaps and two minor flaps, and said folded cartons having vertical score lines running parallel to the flute direction of the carton,* comprising in combination:

a frame;

carton conveyor means for conveying set-up cartons thereon; said carton conveyor means being attached to said frame and having a carton discharge at one end of said carton conveyor means;

carton set-up means located at the other end of said conveyor means for setting up a folded carton fed thereto;

said carton set-up means having at least one vacuum cup for grasping folded cartons on each side during set-up of a carton;

folded carton magazine means located to one side of said set-up means for positioning a stack of folded cartons[;], *said magazine means being so positioned that the direction of travel of feed of folded cartons from said magazine means to said set-up means is parallel to the vertical score lines of said folded cartons and is perpendicular to the direction in which set-up cartons are conveyed from said set-up means by said conveyor means;* folded carton *side* feed means for feeding folded cartons from said folded carton magazine means to said carton set-up means, said feed means having at least one [suction] *vacuum* cup for grasping the bottom carton of a *vertical* stack of *generally horizontally positioned* folded cartons in said magazine and sliding means for sliding said [suction] *vacuum* cup and bottom folded carton from said folded carton magazine means to said carton set-up means, *in a direction of travel of feed of said folded cartons that is parallel to the vertical score lines of said folded cartons and is perpendicular to the direction in which set-up cartons are conveyed from said set-up means by said conveyor means,* and returning to engage the next folded carton in said magazine; and vacuum pump and vacuum control system for *supplying and* controlling the vacuum on said carton set-up means vacuum cups and said feed means vacuum cup, said [vacuum control system having at least one vacuum switch coupled to each said carton set-up means vacuum cup and to said feed means vacuum cup, said switch switching the vacuum between said carton set-up means and said feed means as said feed feed means delivers a folded carton to said carton set-up means whereby said switch simultaneously switches the vacuum back and forth from said carton set-up means to said feed means vacuum cup] *pump-and-control system having a means for actuating and deactuating said vacuum cups at predetermined points in the carton-erection cycle, said points being so selected that each said feed means vacuum cup is actuated whenever it is sliding from said magazine means to said carton set-up means, and is deactuated whenever said set-up means vacuum cups are grasping said folded cartons on each side during said set-up of a carton.*

2. The apparatus in accordance with claim 1, in which said apparatus for setting up folded cartons includes:

a main drive for driving said side feed means, said carton set-up means, and said carton conveyor in a predetermined sequence.

3. The apparatus in accordance with claim 2, in which said apparatus includes:

a gluing station for gluing cartons passing thereby on said carton conveyor means and a compressing station for compressing glued flaps together on a carton prior to discharge of said carton from said apparatus.

4. The apparatus in accordance with claim 2, in which said main [motor] drive includes an electrical motor actuated through a gear box to drive a bell crank mechanism for driving a plurality of chains back and forth responsive to the movement of said bell crank.

5. The apparatus in accordance with claim 4, in which said plurality of chain drives includes upper and lower connected conveyor chain drives having dogs coupled thereto for engaging cartons for movement in said conveyor.

6. The apparatus in accordance with claim 5, in which said plurality of chain drives includes a chain drive operatively connected to said carton set-up means for lifting one said carton set-up means vacuum cup to raise each folded carton in a predetermined sequence.

7. The apparatus in accordance with claim 6, in which said chain drive [connected to said side feed means] is connected through a gear box to a parallel arm mechanism having said vacuum cup attached thereto for raising and lowering said parallel arm mechanism responsive to the movement of said bell crank and chain drive.

8. The apparatus in accordance with claim 7, in which said *electrical motor of said* main drive [motor] is connected through a clutch and chain drive to said side feed means for sliding said side feed means from said folded carton magazine means to said carton set-up means in a timed relationship.

9. The apparatus in accordance with claim [1] *2*, in which said carton set-up means has a carton set-up station having a minor flap [tuck] *tucker* arm mounted adjacent to and adapted to rotate and fold one *minor* flap of each folded carton being set-up in said carton set-up means, said [rotatable tuck] *minor flap tucker arm* being connected to an air cylinder for actuation thereof in a timed sequence.

10. The apparatus in accordance with claim 9, in which a cam shaft controls said vacuum control system and has a cam thereon for actuating an air valve upon the rotation of said cam shaft for actuating said minor flap tucker arm responsive to said cam sequence.

11. The apparatus in accordance with claim 10, *having means for gluing flaps and* in which said cam shaft has a second cam thereon actuating an air valve for actuating an air cylinder for driving [said] *a* compression station compressing member to compress said glued flaps together.

12. The apparatus in accordance with claim 11, in which said *means for gluing flaps is a* glue gun *that* includes a plurality of spray nozzles and a photodetector for actuating said spray nozzles responsive to the carton minor flap blocking out a lamp on the opposite side of said carton from said photodetector.

13. The apparatus in accordance with claim 12, in which said feed means vacuum [cups are] *cup is* mounted to an arm for lifting said [cups] *cup* slightly to engage the next bottom carton.

14. The apparatus in accordance with claim 12, in which said cam shaft has a plurality of additional cams mounted thereto for actuating a plurality of microswitches for actuating [said] *a* clutch connecting said side feed means *with said main drive* whereby one cam actuated microswitch will start said clutch [for actuating said side feed] means and a second said microswitch will disengage said main [motor] drive responsive to a microswitch located adjacent said feed means not being actuated by the return of said side feed means whereby said side feed means will be disabled in the event of a jam.

15. The apparatus in accordance with claim 7, in which said carton conveyor means includes a plurality of flap guides for folding said *cartons'* flaps in a sequence to close said *cartons'* major flaps over said *cartons'* minor flaps after said minor flaps have had glue sprayed thereon by [said] *a* glue gun.

16. The apparatus in accordance with claim 14, in which said cam shaft is driven by a chain drive from said main [motor] drive [from said main motor].

17. The apparatus in accordance with claim 5, in which said bell crank mechanism includes a motor-driven crank driving a crank arm actuating a main drive arm pinned to said frame and includes an extension linkage attached to said main drive, said extension linkage being connected to at least one said chain drive.

18. The apparatus in accordance with claim 17, in which said upper and lower chain drives are connected by a connecting chain.

*19. The apparatus in accordance with claim 1, in which said vacuum pump-and-control system includes a single vacuum pump and means for switching the vacuum developed by said pump back and forth between said carton set-up means vacuum cup and said feed means vacuum cup, whereby said feed means vacuum cup is deactuated at the same time as said set-up means vacuum cup is actuated, at the point in the carton-erection cycle just after said feed means delivers a folded carton to said set-up means.*

*20. The apparatus in accordance with claim 1, in which said folded cartons arrive at said set up means disposed in a substantially horizontal plane so that said folded cartons each have an upper side and an under side, each such side having a major flap, a minor flap, and two side panels, and in which said carton set-up means includes:*

*stationary lower vacuum cup means adapted for grasping and holding down the under side of said folded carton;*

*movable upper vacuum cup means adapted for grasping the upper side of the upper major flap of said folded carton; and*

*elevation means for elevating said upper vacuum cup means, thereby elevating said carton's major flap that said upper vacuum cup means grasps and thereby opening said folded carton into a tubular generally-rectangular partially-set-up carton, the outer edges of said grasped upper major flap being elevated higher than the upper edges of the minor flaps of said partially-set-up carton, said elevation means comprising:*

*rotatable radial arm means vertically rotatable about a first axis that is slightly above the plane of said folded carton, and is parallel to the vertical score lines of said carton, said arm means extending from said first axis a predetermined radial distance to a second axis at which said arm is connected to said upper vacuum cup means;*

*rotation means for rotating said arm means from an approximately horizontal position to an approximately vertical position;*

*adjustment means whereby said radial distance is set to be approximately one-half inch greater than the vertical score line to vertical score line length of said minor flaps; and orientation means adapted to maintain said upper vacuum cup means substantially parallel to said plane.*

*21. In an apparatus for setting up corrugated cardboard cartons from generally horizontally disposed flattened knocked-down carton blanks having their vertical score lines and the flutings of their corrugations parallel to one another, said apparatus including:*

*a magazine for holding a stack of flattened carton blanks;*

*a set-up station having set-up means that open horizontal flattened carton blanks into tubular, generally-rectangular, opened, and at least partially set-up cartons; and that include set-up vacuum-cup means for grasping the flat carton blanks to open them;*

*feed means for feeding flattened carton blanks from the magazine means to the set-up station, said feed means having:*

*feed vacuum-cup means for grasping the carton blanks in the magazine; and*

*means for engaging the feed vacuum-cup means against the outer side of the outermost carton blank of the stack of carton blanks in the magazine;*

*vacuum supply/control means for actuating vacuum cup means and deactuating vacuum cup means, at points in the carton-erection cycle; and*

*means by which the opened and at least partially set-up cartons exit from the set-up station;*

*the improvement comprising:*

*location of the magazine to one side of the set-up station, with the magazine so positioned that the direction of travel of feed of carton blanks from the magazine to the set-up station is parallel to the vertical score lines of the carton blank and is perpendicular to the direction in which the cartons exit from the set-up station; and,*

*in the feed means, reciprocating transport means for slidingly transporting the feed vacuum-cup means and the carton blank grasped thereby, from the magazine to the set-up station in a path parallel to the vertical score lines of the carton blank and perpendicular to the direction in which the cartons exit from the set-up station.*

*22. The apparatus of claim 21, with the further improvement, in said vacuum supply/control means, comprising: vacuum-switching means for switching a single vacuum line back and forth between the feed vacuum-cup means and set-up vacuum-cup means at predetermined points in the carton-erection cycle, one of said points being that at which the flattened carton blank has been fed to the set-up station and the set-up means is about to open the flattened carton blank, said vacuum-switching means being adapted*

*to deactuate the feed vacuum-cup means at said point and at the same time actuate the set-up vacuum-cup means.*

*23. The apparatus of claim 21 in which the flattened carton arrives at the set-up station lying in a substantially horizontal plane, so that it has an upper half and a lower half, each of which halves has a major flap, a minor flap, and two side panels, with the further improvement comprising:*

*stationary set-up vacuum-cup means for grasping the under side of the lower major flap of the carton being opened;*

*movable set-up vacuum-cup means for grasping the upper side of the upper major flap of the carton;*

*cup-transport set-up means adapted for raising the movable set-up vacuum-cup means along a quarter-circle upward path from a first point substantially in the same plane as the flattened carton blank when the blank arrives at the set-up station, to a second point substantially in the same plane as the upper side of the opened carton, said first and second points also lying in a further plane perpendicular to the vertical score lines of the carton, said quarter-circle having a center located approximately in the first-described plane and having a predeterminable radius;*

*adjustment means whereby the radius is set to be at least approximately one-half inch greater than the widths of the set-up carton;*

*means for actuating the stationary set-up vacuum-cup means and the movable set-up vacuum-cup means so that the stationary means grasps and holds down the lower major flap, while the movable means grasps the upper major flap and the cup-transport set-up means raises the movable means away from the stationary means, thereby opening the carton and extending the outer edges of the major flaps beyond the side edges of the minor flaps;*

*orientation means for maintaining the movable vacuum-cup set-up means in an orientation substantially parallel to the face of the major flap as the vacuum-cup set-up means grasps the major flap and opens the carton.*

*24. In an apparatus for setting up cardboard cartons from flattened knocked-down carton blanks, said flattened carton blanks each having an upper and a lower half, each of which halves has a major flap, a minor flap, and two side panels, said apparatus including:*

*a set-up station having set-up means that open horizontal flattened carton blanks into tubular, generally-rectangular, opened, and at least partially set-up cartons; and that include set-up vacuum-cup means for grasping the flat carton blanks to open them; and*

*feed means for feeding flattened carton blanks to the set-up station;*

*the improvement in the set-up means comprising:*

*stationary set-up vacuum-cup means for grasping the under side of the lower major flap of the carton being opened;*

*movable set-up vacuum-cup means for grasping the upper side of the upper major flap of the carton;*

*cup-transport set-up means adapted for raising the movable set-up vacuum-cup means along a quarter-circle upward path from a first point substantially in the same plane as the flattened carton blank when the blank arrives at the set-up station, to a second point substantially in the same plane as the upper side of the opened carton, said first and second points also lying in a further plane perpendicular to the vertical score lines of the carton, said quarter-circle having a center located approximately in the first-described plane and having a predeterminable radius;*

*adjustment means whereby the radius is set to be at least approximately one-half inch greater than the widths of the set-up carton;*

*means for actuating the stationary set-up vacuum-cup means and the movable set-up vacuum-cup means so that the stationary means grasps and holds down the lower major flap, while the movable means grasps the upper major flap and the cup-transport set-up means raises the movable means away from the stationary means, thereby opening the carton and extending the outer edges of the major flaps beyond the side edges of the minor flaps;*

*orientation means for maintaining the movable vacuum-cup set-up means in an orientation substantially parallel to the face of the major flap as the vacuum-cup set-up means grasps the major flap and opens the carton.*

*25. A method of automatically setting up corrugated cardboard cartons from flattened knocked-down carton blanks having their vertical score lines and the flutings of their corrugations parallel to one another, said flattened carton blanks each including four side panels, two inner (minor) flaps, and two outer (major) flaps, comprising the following steps:*

*(1) grasping the outermost carton blank from a vertical stack of generally horizontally disposed flattened carton blanks by means of at least one actuated carton-feed vacuum cup;*

*(2) transporting therefrom said actuated carton-feed vacuum cup and the flat carton blank grasped thereby, slidingly in a direction parallel to the vertical score lines of said carton blank, until said flat carton blank has been transported above and lies horizontally against at least one unactuated lower set-up vacuum cup;*

*(3) placing at least one unactuated upper set-up vacuum cup above and engaging against the upper side of said flat horizontal carton blank;*

*(4) deactuating and thereby releasing the grasp of said carton-feed vacuum cup;*

*(5) actuating said upper and lower set-up vacuum cups, thereby causing said actuated cups to grasp the opposite sides of said flat carton blank;*

*(6) raising said actuated upper set-up vacuum cup away from said lower set-up vacuum cup while maintaining the faces of said cups substantially parallel to one another, thereby opening said flat carton blank into a tubular, generally-rectangular form;*

*(7) tucking in the inner (minor) flaps and then the outer (major) flaps of said opened carton blank, and fastening said flaps together, thereby making a set-up carton.*

*26. The method of claim 25 in which the fourth and fifth steps occur simultaneously, as a single vacuum line is at the same time switched to said upper and lower set-up vacuum cups and away from said carton-feed vacuum cup.*

*27. The method of claim 25 in which, at the end of the second step, said unactuated lower set-up vacuum cup is under and engaged against a lower major flap on the under side of the horizontal flat carton blank; in the third step, said unactuated upper set-up vacuum cup is placed against an upper major flap on the upper side of the horizontal flat carton blank; and, in the sixth step, said lower set-up vacuum cup is stationary and the outer edges of the upper major flap are raised above the upper edges of the minor flaps of said opened carton blank.*

*28. The method of claim 27 in which, in the sixth step, said upper set-up vacuum cup follows a quarter-circle upward path from a first point in a first plane substantially that of the upper side of the horizontal flat carton blank to a second point in a second plane substantially that of the upper side of the opened carton, said first and second points lying in a further plane perpendicular to said hinge axes, said quarter-circle having a center located approximately in said first plane and having a radius approximately one-half inch greater than the width of the set-up carton.*

* * * * *